Nov. 19, 1963

O. M. KURITZA 3,111,031

FLUID LEVEL INDICATOR

Filed March 7, 1962

INVENTOR.
Oleh M. Kuritza
BY Mueller & Aichele
Attys.

United States Patent Office 3,111,031
Patented Nov. 19, 1963

3,111,031
FLUID LEVEL INDICATOR
Oleh M. Kuritza, Chicago, Ill., assignor to Motorola, Inc., Chicago, Ill., a corporation of Illinois
Filed Mar. 7, 1962, Ser. No. 178,152
5 Claims. (Cl. 73—295)

This invention relates to gauges and more particularly to a liquid level indicating sensor including thermistor heat responsive devices to indicate the level of liquid in a container.

There are many applications in which a liquid level sensing device is required, such as in the fuel tank of an automobile to indicate the supply of gasoline or other fuel in the tank. In such cases it is desired that the indication be provided as an electrical signal so that the indication may be shown by a gauge on the dash, or in some other position which may be remote from the fuel tank. The systems which have been used and which are available as inexpensive devices have been inaccurate.

It has been proposed to use electrical components having values which change with temperature for liquid level sensing and indication. However, prior devices have required complicated circuits which have resulted in the overall cost being greater than can be accommodated. Further, such devices have not been entirely suitable for use in a fuel tank of a vehicle, such as an automobile.

It is therefore an object of the present invention to provide a new and improved system for indicating liquid level in a container.

A further object of the present invention is to provide a simple electrically operative temperature sensitive fluid level indicating system and circuit therefor.

Another object of the present invention is to provide a system of indicating liquid level wherein the indication is occasioned by a change in temperature of one or more of a plurality of thermistors disposed within a liquid containing tank.

A feature of the present invention is the provision of a sensor device comprising a plurality of positive temperature-coefficient thermistors submerged in a tank of liquid at different levels therein, and connected in parallel whereby the overall resistance varies with the level of liquid within the container.

Another feature of the present invention is the provision of a sensor device comprising a plurality of positive temperature coefficient thermistors connected in parallel and positioned at different levels in a container, and wherein the thermistors are constructed so that the resistance value rises abruptly as a critical temperature is reached. A temperature compensating network may be connected in the circuit of the sensor device.

The liquid level indicator of the present invention incorporates a plurality of thermistors connected in parallel and submerged at different levels in a liquid. As the liquid level within the container drops, one or more of the thermistors becomes exposed and as the heat conduction in air is less than that when it is submerged in the liquid, its temperature increases sufficiently to cause a sharp increase in its resistance. This causes an increase in the overall resistance of the parallel circuit including the thermistors. As a result of this increase, a drop in current is indicated at a suitable gauge. The gauge itself may be of the type used as an automobile fuel gauge consisting of a bimetallic arm which is heated by current flow through the indicator circuit. The thermistor may be constructed to produce a sharp increase in resistance at a temperature within the range encountered in the particular system. The system of the present invention may be temperature compensated by use of a positive temperature coefficient thermistor with any given characteristic.

Figure 1:
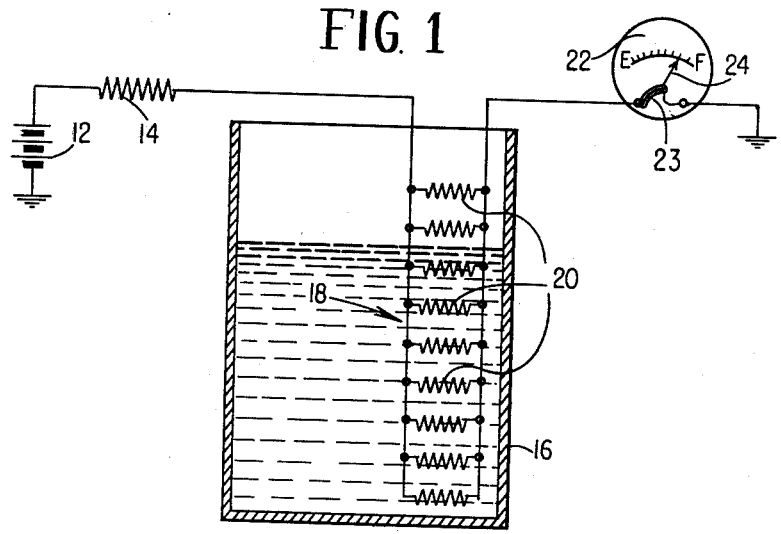
FIG. 1 is a schematic diagram of the indicator of the present invention.

Referring now particularly to FIG. 1, an indicator system is illustrated for indicating the level of liquid in a tank or container. The circuit includes a D.C. voltage source 12 which may be the voltage of the electrical system of an automobile. Connected in series to the source are thermistor 14, sensor device 18 within tank 16, and the gauge 22. The sensor device 18 includes a plurality of positive temperature coefficient thermistors 20 connected in parallel. The thermistors 20 are disposed within the tank 16 at different levels therein. The gauge 22 may include a bimetallic element 23 comprised of two metals having different coefficients of thermal expansion and which changes the position of pointer 24 to indicate the fluid level. Obviously, a current indicator of any other known type can be used. The thermistor 14 is used to compensate the device for changes in ambient temperature, and may be connected either in series or in parallel with the sensor device 18.

The thermistors 20 will each have a current passing therethrough and this produces heat. When the liquid level is such that a thermistor 20 is submerged in the liquid, the liquid will carry away the heat produced quite rapidly so that the thermistor will remain cool. However, when the liquid level is below a particular thermistor the air about that thermistor will not conduct the heat away as rapidly and therefore the temperature of the thermistor will rise. This will cause its resistance to increase to reduce the current flow from the source 12 to the gauge 22.

Figure 2:
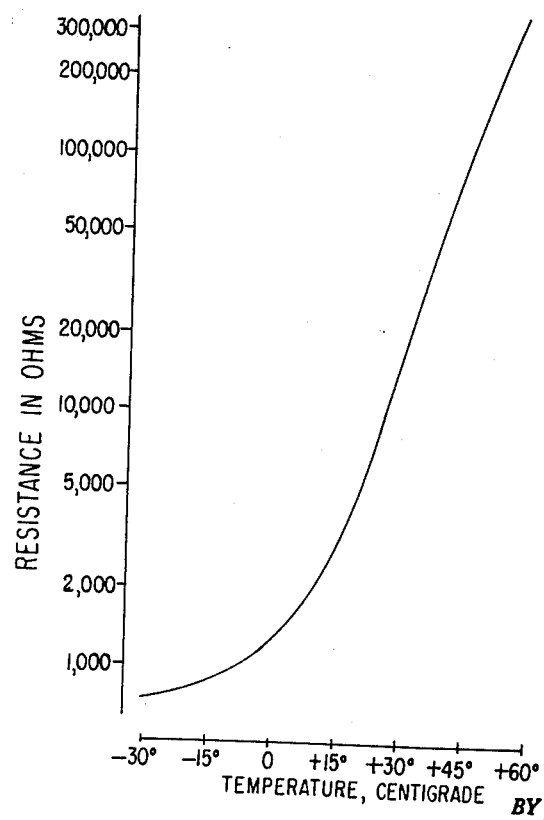
FIG. 2 is a chart illustrating the temperature-resistance characteristic of a sensor used in the indicator.

The individual thermistors 20 may be of a construction such that a sharp increase in resistance is produced in response to increase in temperature, at some critical temperature. A typical response characteristic for the positive temperature coefficient thermistor is shown by the curve of FIG. 2. This is the characteristic of the type 0A positive coefficient thermistor manufactured and sold by Motorola Inc., assignee of this application. In this thermistor a change in the resistance value from 10,000 ohms to 20,000 ohms takes place with a temperature change from 27° to 32° C.

With the resistance of a thermistor 20 increasing so sharply when the liquid falls below the thermistor, the overall resistance of the parallel connected thermistors 20 will increase to reduce the current through the circuit to the gauge 22. This will provide a change in current by steps as individual thermistors are submerged or left exposed to the air. These changes in current applied to the gauge 22 will change the heating of the bimetallic element thereof, and will, in turn, change the indication on the gauge.

The fluid level indicating circuit of the present invention includes therefore a fluid level sensor having a plurality of thermistors parallel connected and disposed at different levels within a fluid container. Current is supplied to the thermistors by means of a D.C. voltage source and the resistance of the thermistors controls the amount of current. An indicator which responds to the current shows the liquid level upon a gauge. It will be understood that changes in the temperature of the liquid itself or in the vapor above the liquid can be compensated for by a temperature sensitive element so that the utility of the device is not thereby impaired.

I claim:

1. A sensing system for indicating the level of liquid within a container including in combination, conductor means adapted to be connected to a source of D.C. voltage, a sensor having first and second conductors and comprising a plurality of positive temperature coefficient thermistors disposed at various levels within said container and connected in parallel directly between said first and second conductors, means connecting said sensor in series with said conductor means, bimetallic heat responsive indicating means series connected to said sensor and adapted to produce an indication which varies with the current applied thereto, and temperature compensating means adapted to temperature compensate said sensing device for changes in ambient temperature connected between said conductor means and said sensor, whereby as the liquid level drops within the container and said individual thermistors are selectively exposed thereby to increase the temperature of said thermistors, the resistance of said thermistors increases the current through said circuit and applied to said bimetallic device decreases thus reducing the temperature at said bimetallic device to indicate the level of the liquid.

2. A fluid level indicating system in accordance with claim 1 wherein said temperature compensating means comprises a positive temperature coefficient thermistor.

3. A sensing system for indicating the amount of liquid within a container, including in combination, direct current voltage supply means, an electrical indicating device for producing an indication which varies with the current applied thereto, and a sensor device connected in series between said voltage supply means and said indicating device, said sensor device including first and second conductors and a plurality of positive temperature coefficient thermistors aligned to be disposed at different levels within the container, said thermistors being selectively exposeable as the liquid level within the container lowers so that the temperature of each exposed thermistor increases, each of said thermistors being connected directly between said first and second conductors to reduce current flow between said conductors as the resistance thereof increases with increase in temperature, whereby the current passing through said sensor device to said indicating device is reduced.

4. A sensing system for indicating the amount of liquid within a container, including in combination, direct current voltage supply means, an electrical indicating device for producing an indication which varies with the current applied thereto, and a sensor device connected in series between said voltage supply means and said indicating device, said sensor device including first and second conductors and a plurality of positive temperature coefficient thermistors aligned to be disposed at different levels within the container, said thermistors being selectively exposeable as the liquid level within the container lowers so that the temperature of each exposed thermistor increases, each of said thermistors being connected directly between said first and second conductors to reduce current flow between said conductors as the resistance thereof increases with increase in temperature, said thermistors presenting a sudden increase in resistance over a relatively narrow temperature range, whereby the current passing through said sensor device to said indicating device is reduced.

5. A sensing system for indicating the amount of liquid within a container, including in combination, direct current voltage supply means, an electrical indicating device for producing an indication which varies with the current applied thereto, a sensor device connected in series between said voltage supply means and said indicating device, said sensor device including a first conductor and a second conductor and a plurality of positive temperature coefficient thermistors aligned to be disposed at different levels within the container, said thermistors being selectively exposeable as the liquid level within the container lowers so that the temperature of each exposed thermistor increases, each of said thermistors being connected directly between said first and second conductors to reduce current flow between said conductors as the resistance thereof increases with increase in temperature, and temperature compensating means connected in said system and responsive to ambient temperature variation to correct for the same in said system, whereby the current passing through said sensor device to said indicating device is reduced.

References Cited in the file of this patent

UNITED STATES PATENTS

| 1,130,829 | Ackerman | Sept. 20, 1938 |
| 2,175,890 | Glowatzki | Oct. 10, 1939 |
| 2,439,835 | Wendt | Apr. 20, 1948 |
| 2,685,203 | McEvoy et al. | Aug. 3, 1954 |

FOREIGN PATENTS

| 545,384 | Belgium | Aug. 20, 1956 |

OTHER REFERENCES

Vacuum Deposition of Thin Films (Holland), published by John Wiley & Sons Inc. (New York), 1956. (Page 242 relied on. Copy in Scientific Library. Call #TS 695H6.)